(12) United States Patent
Kim et al.

(10) Patent No.: US 9,648,587 B2
(45) Date of Patent: May 9, 2017

(54) METHOD AND APPARATUS FOR TRANSMITTING AND RECEIVING A WHITESPACE MAP IN A WIRELESS COMMUNICATION SYSTEM

(71) Applicant: LG Electronics Inc., Seoul (KR)

(72) Inventors: Suhwook Kim, Gyeonggi-do (KR);
Eunsun Kim, Gyeonggi-do (KR);
Yunjung Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 14/353,836

(22) PCT Filed: Oct. 31, 2012

(86) PCT No.: PCT/KR2012/009043
§ 371 (c)(1),
(2) Date: Apr. 24, 2014

(87) PCT Pub. No.: WO2013/066040
PCT Pub. Date: May 10, 2013

(65) Prior Publication Data
US 2014/0314032 A1  Oct. 23, 2014

Related U.S. Application Data

(60) Provisional application No. 61/553,278, filed on Oct. 31, 2011.

(51) Int. Cl.
*H04W 16/06* (2009.01)
*H04W 72/02* (2009.01)
(Continued)

(52) U.S. Cl.
CPC ........... *H04W 72/02* (2013.01); *H04W 16/14* (2013.01); *H04W 52/383* (2013.01);
(Continued)

(58) Field of Classification Search
None
See application file for complete search history.

(56) References Cited

U.S. PATENT DOCUMENTS 5,469,431 A * 11/1995 Wendorf ............... H04H 60/25
348/E7.017
2009/0046592 A1* 2/2009 Aoyama ........... H04W 72/1278
370/252
(Continued)

FOREIGN PATENT DOCUMENTS

CN  101300765 A  11/2008
KR  10-2011-0085836 A  7/2011
(Continued)

OTHER PUBLICATIONS

Written Opinion and International Search Report issued in corresponding International Patent Application No. PCT/KR2012/009043 dated Mar. 25, 2013.
(Continued)

*Primary Examiner* — Kevin C Harper
*Assistant Examiner* — Derrick V Rose
(74) *Attorney, Agent, or Firm* — Morgan, Lewis & Bockius LLP

(57) ABSTRACT

The present invention relates to a wireless communication system, and more specifically, to a method and apparatus for transmitting and receiving a whitespace map. The method for transmitting whitespace map (WSM) information from a first station (STA) to a second STA includes the steps of: setting a map version bit value included in the WSM information as a predetermined value; and transmitting the WSM information including the predetermined map version bit value to the second STA.

12 Claims, 15 Drawing Sheets

(51) Int. Cl.
   *H04W 16/14* (2009.01)
   *H04W 52/38* (2009.01)
   *H04W 76/02* (2009.01)
   *H04W 72/04* (2009.01)
   *H04W 72/08* (2009.01)
   *H04W 52/36* (2009.01)

(52) U.S. Cl.
   CPC ..... *H04W 72/0406* (2013.01); *H04W 76/023* (2013.01); *H04W 52/367* (2013.01); *H04W 72/082* (2013.01)

(56) References Cited

U.S. PATENT DOCUMENTS

| | | |
|---|---|---|
| 2011/0069657 A1 | 3/2011 | Gholmieh et al. |
| 2011/0090887 A1 | 4/2011 | Kim et al. |
| 2011/0222488 A1 | 9/2011 | Kim et al. |
| 2011/0243078 A1* | 10/2011 | Kim ................ H04W 72/0426 370/329 |
| 2011/0268095 A1 | 11/2011 | Kim et al. |
| 2012/0282959 A1* | 11/2012 | Abraham .............. H04L 5/0096 455/500 |
| 2012/0307685 A1 | 12/2012 | Kim et al. |
| 2013/0114586 A1 | 5/2013 | Kim et al. |

FOREIGN PATENT DOCUMENTS

| | | |
|---|---|---|
| WO | 2011/106538 A1 | 9/2011 |
| WO | 2011/111917 A1 | 9/2011 |
| WO | 2011/115448 A2 | 9/2011 |
| WO | 2011/126188 A1 | 10/2011 |

OTHER PUBLICATIONS

Kim et al., "IEEE P802.11 Wireless LANs," IEEE 802.11-11/1288r0, Sep. 20, 2011.
Office Action issued in Canadian Patent Application No. 2851625 dated Jun. 4, 2015.
Office Action issued in Canadian Patent Application No. 2,851,625 dated Jul. 18, 2016.
Chinese Office Action issued in corresponding Chinese Patent Application No. 2012-80053712 dated Dec. 19, 2016.

* cited by examiner

FIG. 6

| Element ID | Length | Map ID | Channel Map |
|---|---|---|---|

Octet     1         1         1         N (a)

| Type | Map version |
|---|---|

Bits     1         1-7

| Device Type | Channel Number N | Max. Transmission Power level on Channel N | Channel Number M | Device Transmission Power level on Channel M | ...... | Channel Number K | Max. Transmission Power level on Channel K | Validity time |
|---|---|---|---|---|---|---|---|---|

Octets:   1    1    1    1    1       1    1    8

(a)

| Device Type | Channel Number N | Max. Transmission Power level on Channel N | Validity time | ...... | Channel Number K | Max. Transmission Power level on Channel K | Validity time |
|---|---|---|---|---|---|---|---|

Octets:   1    1    1    8       1    1    8

| Device Type | Starting channel Number (S) | Number of Channels (L) | Channel Bitmap | Validity time |
|---|---|---|---|---|

Octets: 1     1     1     Variable     8

FIG. 9

These four fields are repeated according to the available channels

| Device Type | Start Frequency | Stop Frequency | Max. allowed transmission power | Validity time |
|---|---|---|---|---|

Octets: 1     1     1     Variable     8

(a)

These three fields are repeated according to the available channels

| Device Type | Start Frequency | Stop Frequency | Max. allowed transmission power | Validity time |
|---|---|---|---|---|

Octets: 1     1     1     Variable     8

These four fields are repeated according to the available channels

| Device Type | Center Frequency | Channel Bandwidth | Max. allowed transmission power | Validity time |
|---|---|---|---|---|

Octets:  1              1              1              Variable        8

(a)

These three fields are repeated according to the available channels

| Device Type | Center Frequency | Channel Bandwidth | Max. allowed transmission power | Validity time |
|---|---|---|---|---|

Octets:  1              1              1              Variable        8

| Element ID | Length | Map ID |
|---|---|---|

Octets:    1            1           1

FIG. 12

| Category | Public Action | Length | Device Class | Device Identification Information | Device Location (Optional) |
|---|---|---|---|---|---|
| 1 | 1 | 1 | 1 | 1 | Variable |

Octets:

(a)

| Category | Public Action | Length | WSM IE |
|---|---|---|---|
| 1 | 1 | 1 | Variable |

Octets:

(b)

(a)

(b)

METHOD AND APPARATUS FOR TRANSMITTING AND RECEIVING A WHITESPACE MAP IN A WIRELESS COMMUNICATION SYSTEM

TECHNICAL FIELD

The present invention relates to a wireless communication system, and more particularly, a method and apparatus for transmitting and receiving a whitespace map.

BACKGROUND ART

Wireless Local Area Network (WLAN) technology standards are established by the IEEE 802.11 standards committee. IEEE 802.11a and 11b respectively provide maximum data rates of 11 Mbps and 54 Mbps using unlicensed bands of 2.4. GHz and 5 GHz. IEEE 802.11g adopts OFDM (Orthogonal Frequency Divisional Multiplexing) and provides maximum data rates of 54 Mbps. IEEE 802.11n adopts MIMO-OFDM and provides maximum data rates of 300 Mbps for 4 spatial streams. IEEE 802.11n supports up to 40 MHz channel bandwidth and provides maximum data rates of 600 Mbps.

A communication scheme that allows an operation of an unlicensed user in a frequency band that is basically defined for use of a licensed user has been discussed. Here, a frequency that is not temporarily used by a licensed user may be referred to as a whitespace, and in particular, a whitespace in a TV band may be referred to as a TV whitespace (TVWS).

IEEE 802/11af standard for defining operations of unlicensed devices in the TV whitespace (TVWS) band is currently under development.

TVWS includes VHF (Very High Frequency) bands (54 to 60, 76 to 88 and 174 to 216 MHz) and UHF (Ultra High Frequency) bands (470 to 698 MHz) allocated for TV broadcast and refers to a frequency band permitted for use by an unlicensed device under the condition that communications of licensed devices (devices for TV broadcast, wireless microphones, etc.) operating in the corresponding frequency bands are not hindered.

While operations of all unlicensed devices are permitted in the range of 512 to 608 MHz and 614 to 698 MHz except for some special cases, 54 to 60 MHz, 76 to 88 MHz, 174 to 216 MHz and 470 to 512 MHz are permitted for communication between fixed devices only. A fixed device refers to a device performing transmission at a fixed location only. In the following description, while the TVWS band includes the above-mentioned TVWS, the present invention is not limited thereto.

An unlicensed device that wants to use TV whitespace band needs to provide a licensed device protection function. Accordingly, the unlicensed device must check whether a licensed device occupies the corresponding TV band before starting transmission in the TV whitespace band. That is, the unlicensed device is permitted for use in the whitespace band only when the licensed device is not used in the whitespace band.

To achieve this, the unlicensed device needs to access a geo-location database (GDB) through the Internet or a dedicated network to obtain information about a list (i.e., a set of available channel(s)) of channels available in a corresponding area. The geo-location database stores and manages information about licensed devices registered therein and information about channels dynamically changed according to geographical positions of the licensed devices and time for which the licensed devices are used. To solve a problem of coexistence of unlicensed devices using the whitespace, a signaling protocol such as a common beacon frame and a spectrum sensing mechanism can be used.

In IEEE 802.11, a TVWS terminal can refer to an unlicensed device operating in the TVWS spectrum using an IEEE 802.11 medium access control (MAC) layer and physical (PHY) layer. In the specification, a station (STA) refers to a TVWS terminal operating in the TVWS spectrum unless otherwise mentioned.

STA needs to provide a function of protecting an incumbent user or a primary user allowed to perform incumbent access including a licensed user (TV user, wireless microphone, etc.). That is, when an incumbent user is using the TVWS, STA has to stop use of the TVWS. Accordingly, STA needs to detect an available channel (channel that is not used by licensed devices) that can be used by unlicensed devices and operate in the available channel.

STA can detect an available channel through spectrum sensing mechanism or by accessing the GDB to determine a TV channel schedule. Energy detection (method of determining that an incumbent user is using TVWS when the intensity of a received signal is higher than a predetermined value) and feature detection (method of determining that an incumbent user is using TVWS when a digital TV preamble is detected) can be used as the spectrum sensing mechanism. In addition, STA needs to access the GDB to acquire GDB information based on the position thereof to check whether a licensed device uses a channel in the position. STA should access the GDB and acquire the information with sufficient frequency to protect the licensed device.

When it is determined that an incumbent user is using a channel immediately adjacent to the currently used channel through the spectrum sensing mechanism or GDB, a terminal (or STA) and a base station (or access point (AP)) can protect the incumbent user by reducing transmission power.

DISCLOSURE

Technical Problem

There is a need for a method of effectively use radio resources by an unlicensed user if possible while minimizing interference of the unlicensed user to a licensed user when an operation of the unlicensed user is allowed in a frequency band that is basically defined for use of the licensed user (or a preferential user)

In a conventional system, an unlicensed user cannot receive available channel information or transmission power constraint information in a whitespace for simply providing information, and thus, an unlicensed user that enters a whitespace band inevitably consumes much time and many resources to acquire the available channel information, for example.

An object of the present invention devised to solve the problem lies in a method for identifying informative-purpose available channel information, and a detailed operation of a device using the method.

It is to be understood that both the foregoing general description and the following detailed description of the present invention are exemplary and explanatory and are intended to provide further explanation of the invention as claimed.

Technical Solution

The object of the present invention can be achieved by providing a method of transmitting whitespace map (WSM)

information from a first station (STA) to a second STA, the method including configuring a value of a map version bit contained in the WSM information to a predetermined value when the WSM information is for informative purpose, and transmitting the WSM information containing the map version bit having the predetermined value to the second STA.

In another aspect of the present invention, provided herein is a method of receiving whitespace map (WSM) information from a first station (STA) to a second STA, the method including receiving the WSM information containing a map version bit from the first STA, determining whether a value of the map version bit corresponds to a predetermined value, and storing the received WSM information for informative purpose when the value of the map version bit corresponds to the predetermined value.

In another aspect of the present invention, provided herein is a first station (STA) for transmitting whitespace map (WSM) information to a second STA, the first STA including a transceiver configured to transmit and receive to and from other devices, and a processor configured to control the first STA including the transceiver, wherein the processor is configured to configure a value of a map version bit contained in the WSM information to a predetermined value when the WSM information is for informative purpose, and to transmit the WSM information having the predetermined value to the second STA using the transceiver.

In another aspect of the present invention, provided herein is a second station (STA) for receiving whitespace map (WSM) information from a first STA, the second STA including a transceiver configured to transmit and receive to and from other devices, and a processor configured to control the second STA including the transceiver, wherein the processor is configured to receive the WSM information containing a map version bit from the first STA, to determine whether a value of the map version bit corresponds to a predetermined value, and to store the received WSM information for informative purpose when the value of the map version bit corresponds to the predetermined value.

The following common features can be applied to the embodiments of the present invention.

The map version bit configured to a value except for the predetermined value may indicate that an updated WSM is transmitted The value of the map version bit may be increased by 1 whenever the updated WSM is transmitted.

The value of the map version bit may have any one of 0 to 127.

The predetermined value may be 127.

The map version bit configured to the predetermined value may not cause change in enablement state of the second STA.

The map version bit configured to the predetermined value may not cause WSM update of the second STA.

A target channel to be scanned by the second STA may be determined based on available channel information indicated by the informative-purpose WSM information.

Transmission power in a whitespace band of the second STA may be determined based on maximum transmission power information indicated by the informative-purpose WSM information.

It is to be understood that both the foregoing general description and the following detailed description of the present invention are exemplary and explanatory and are intended to provide further explanation of the invention as claimed.

Advantageous Effects

The present invention may provide a method for identifying informative-purpose available channel information, and a detailed operation of a device using the method. The present invention may provide an effective operation by reducing time taken to determine an available channel in a whitespace by an unlicensed device. In addition, according to the present invention, an unlicensed device that enters a whitespace band can know transmission power in the whitespace, and thus, the unlicensed device can initiate an operation in the whitespace without causing interference.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a diagram illustrating an example of a WSM frame format;

FIGS. 7 to 10 are diagrams illustrating examples of a channel map field format according to the present invention;

FIG. 11 is a diagram illustrating an example of a CVS frame format;

FIG. 12 is a diagram illustrating exemplary formats of a CAQ request frame and a CAQ response frame;

BEST MODE

Figure 1:
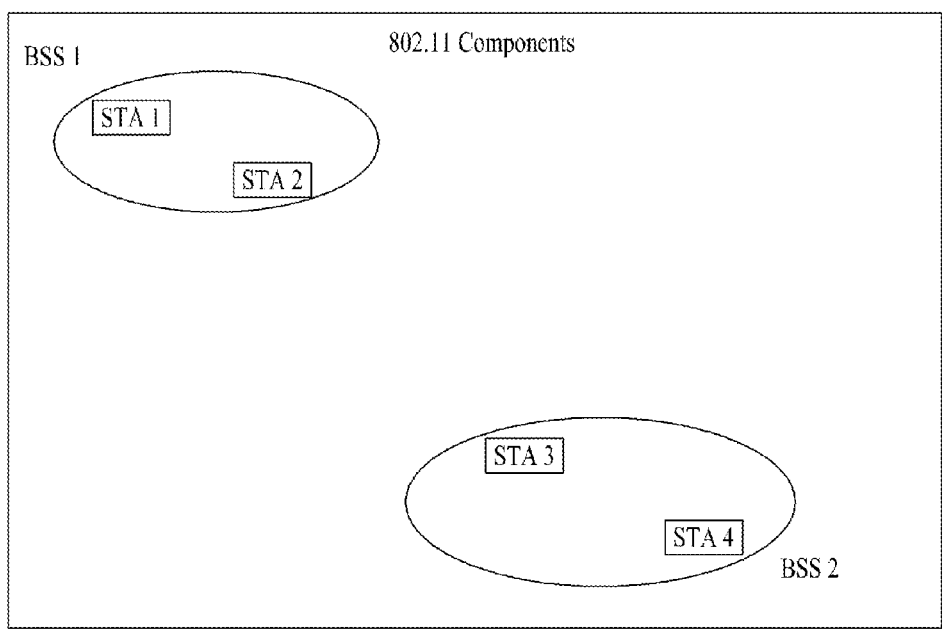
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 illustrates an exemplary configuration of an IEEE 802.11 system to which the present invention is applicable.

IEEE 802.11 can be composed of a plurality of components and provide a WLAN supporting station (STA) mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
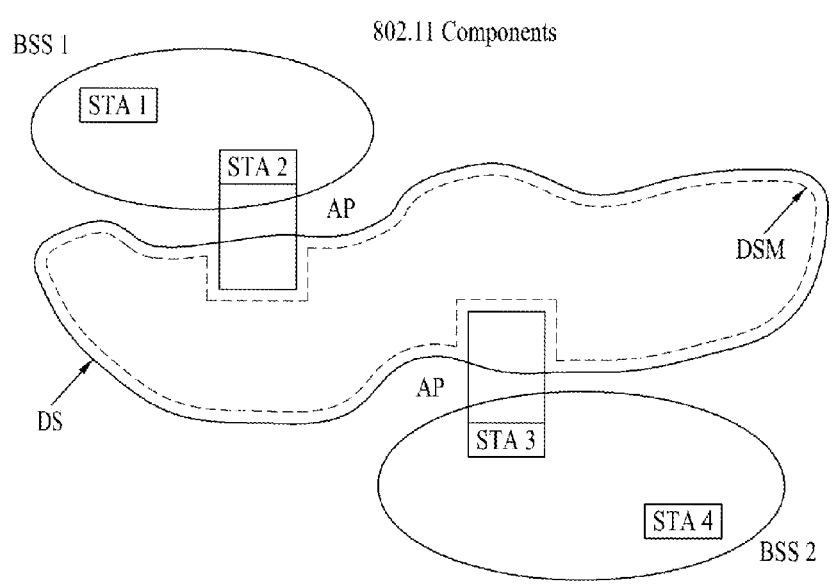
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
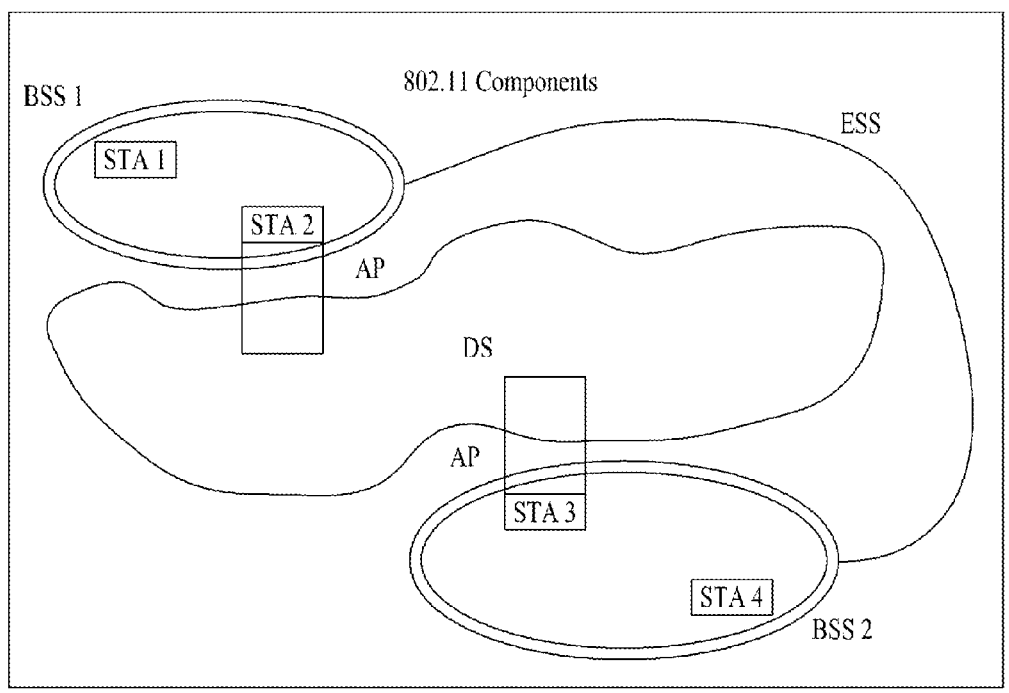
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and an ESS. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
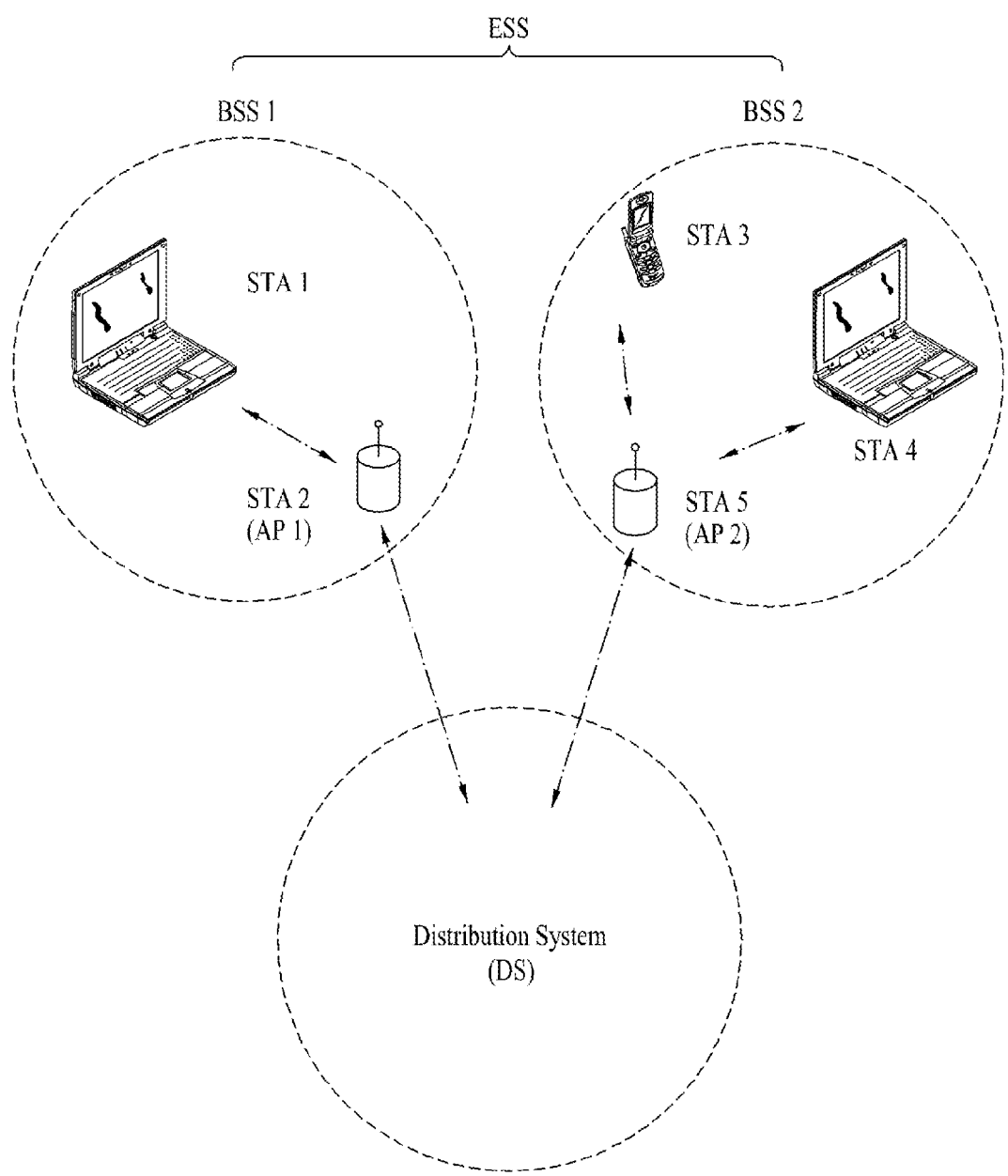
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc in other wireless communication fields.

Available Channel in Whitespace

For operation of an STA in whitespace, it is necessary to preferentially provide protection of a licensed device (or incumbent user). Accordingly, the STA needs to find an available channel that is not used by the licensed device and thus can be used by an unlicensed device and to operate on the available channel. If the channel used by the STA is no longer available, utilization of the channel is stopped.

To check channel (e.g. TV channel) availability in the whitespace (e.g. TVWS), the STA can perform spectrum sensing or access a GDB to find out a TV channel schedule. GDB information may include information on a specific channel use schedule (i.e. channel use time) of the licensed device at a specific position. The STA that wants to check availability of a TV channel needs to access the GDB through the Internet to acquire GDB information based on location information thereof. This operation needs to be performed at an interval sufficient to protect the licensed device.

In the specification, information on available channels and frequencies, received from the GDB, is called a whitespace map (WSM). The WSM is a map of information on channels available for unlicensed devices in the TVWS based on channel and frequency information obtained by an STA from the GDB. The WSM may include information on an available channel list or frequencies that can be used by unlicensed devices. Channels included in the available channel list are channels that are not used by signals (or users) that need to be legally protected and can be used by an unlicensed device when the unlicensed device accesses the GDB. When an unlicensed device requests an available channel after a predetermined lapse of time from when the unlicensed device accesses the GDB, the WSM may include information on channels and frequencies which are available from the corresponding time. Alternatively, when the unlicensed device requests an available channel to the GDB, it is possible to transmit information on available channels and frequencies by signaling channels that cannot be used by the unlicensed device.

Federal communications commission (FCC) TVWS regulations currently define two device types. That is, a personal/portable device with low power and a fixed device with high power, which operates at a fixed position. The fixed device may be referred to as a fixed STA and the personal/portable device may be referred to as a P/P STA. The fixed STA and P/P STA may correspond to normal STAs (that is, STAs including an AP and a non-AP) in the WLAN system. When the devices of two types operate in the TVWS, different operation rules may be applied thereto. The fixed device transmits/receives signal at a specific position that is not varied. The fixed device needs to access the GDB to acquire information on available channels to transmit a signal at the specific position. While the fixed device may include a positioning device such as a GPS, an installer can directly input the position of the fixed device to transmit the location information of the fixed device to the GDB. When the installer directly inputs the position of the fixed device, the fixed device is operated on the assumption that once the fixed device is installed and the position thereof is input, the position does not change. When the position of the fixed device is changed, the changed position needs to be registered. The fixed device may serve another fixed device of the same type and the P/P device. When the fixed device receives information on available channels from the GDB, the fixed device needs to transmit information on the device type thereof and receive information on available channels that can be directly used thereby. To serve the P/P device, the fixed device needs to additionally acquire information on available channels that can be used by the P/P device from the GDB or a proxy server connected to the GDB. This is because the fixed device and the P/P device use different channel intervals and operate with different maximum allowed transmission powers and different requirements for neighboring channels and thus the respective device types require different available channel lists. For example, the fixed device is permitted to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device can transmit a signal with higher power than the P/P device and up to 4 watts is permitted for the fixed device as effective isotropic radiated power (EIRP).

The P/P device can transmit/receive signals at a position that is not fixed and the position thereof can be changed. The P/P device can be carried by a person and mobility thereof cannot be predicted. The available frequency band of the P/P device is 512 to 608 MHz and 614 to 698 MHz and maximum transmission power thereof is 100 mW (EIRP). That is, the allowed transmission power of the P/P device is limited compared to the fixed device.

The P/P device can be categorized into a mode II device and a mode I device according to whether or not the P/P device has identification capability, that is, geo-location capability and capability of accessing the GDB through the Internet. The mode II device has geo-location capability and GDB access capability and can access the GDB to acquire information about available channels at the location thereof and then operate in the TVWS at the corresponding location. In addition, the mode II device can acquire the available channel information from the GDB and then initiate communication through a network by transmitting a signal (e.g. enable signal) for instructing communication to be initiated to the mode I device. The mode I device need not have the geo-location capability or GDB access capability and operates under the control of the mode II device or a fixed device. The mode I device can acquire available channel information from the mode II device of fixed device and needs to periodically check validity of available channels. In addition, the mode I device can be permitted to operate on an available channel upon confirmation of the device ID thereof. Here, the mode II device or fixed device may correspond to an enabling STA and the mode I device may correspond to a dependent STA. An enabling signal transmitted from the enabling STA to the dependent STA may correspond to a beacon frame.

A P/P device corresponding to the mode II device can provide a service to another P/P device or fixed device. In this case, the mode II P/P device can acquire available channel information for the fixed device from the GDB and deliver the available channel information to the fixed device.

The GDB can calculate available channel information at a location requested by an unlicensed device and transmit the information to the unlicensed device in consideration of a channel use schedule and protection contour of an incumbent user such as a DTV or microphone. Parameters considered by the GDB when the GDB calculates the available channel information include a device type, operation location, transmission power and spectrum mask. In the FCC regulations, whether or not to use a neighboring channel depends on device type. For example, when a DTV receiver is used on channel #30, the fixed device cannot use channels #29 and #31 even if channels #29 and #31 are not occupied but the P/P device can use the two channels. This is because the possibility that the fixed device interferes with a neighboring channel is high since the fixed device has high transmission power.

While exemplary embodiments of the present invention will be described hereinafter using the TVWS as an exemplary whitespace for convenience, the scope of the present invention is not limited thereto. That is, the scope of the present invention includes exemplary embodiments of the present invention, which are applied to operations in all whitespaces controlled by a DB that provides information on available channels at a specific position. For example, it is expected to permit operation of an unlicensed device, controlled by the GDB, in frequency bands that do not currently correspond to the whitespace but are expected to become whitespace and exemplary embodiments of the present invention applied thereto can be included within the scope of the present invention. Furthermore, while the principle of the present invention is described on the basis of FCC regulations for the TVWS, the scope of the present invention is not limited to operations in whitespace according to the FCC regulations and includes exemplary embodiments of the present invention, which are implemented on whitespaces conforming to other regulations.

Acquisition of Available Channel Information of Mode I Device

A description will be given of an exemplary process through which a mode I device operating in the whitespace acquires available channel information from a mode II device or a fixed device.

Figure 5:
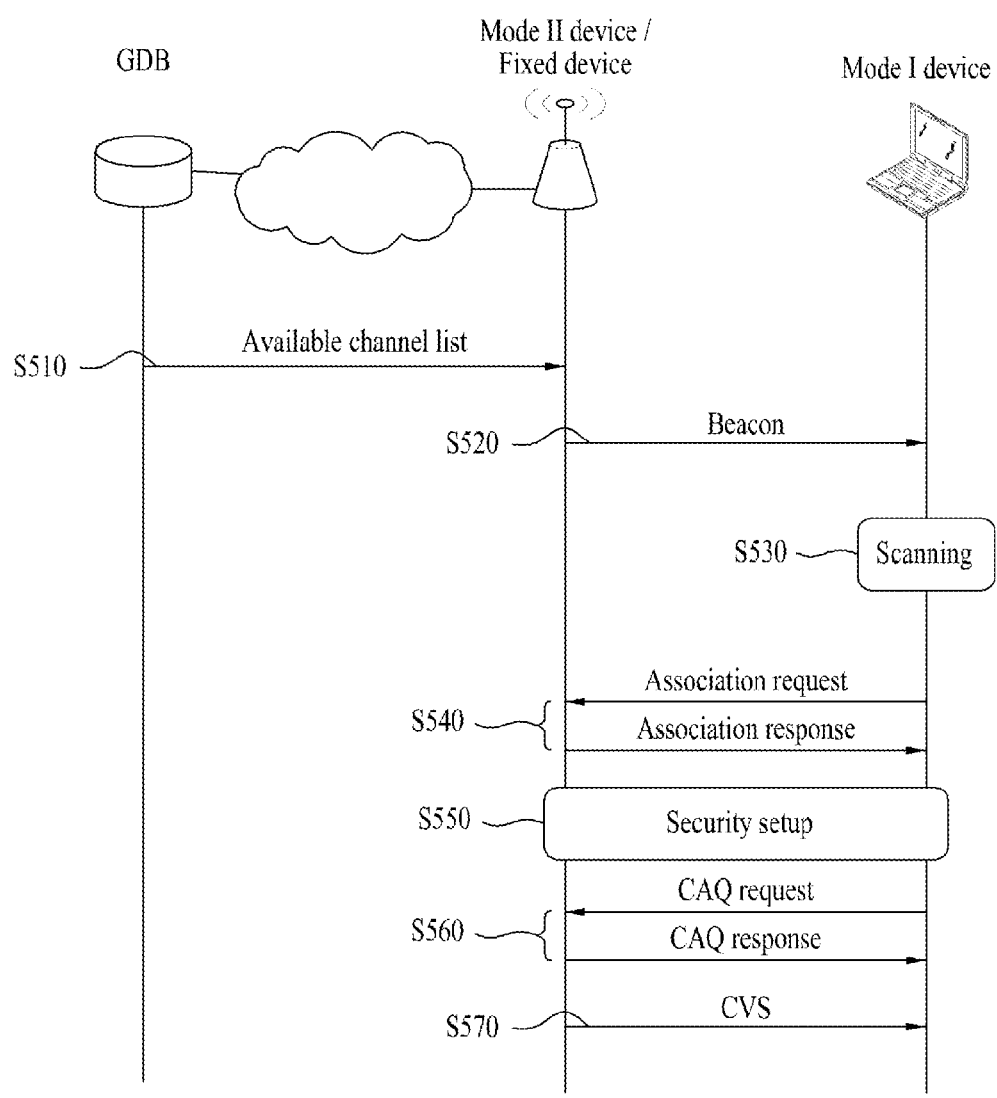
FIG. 5 is a flowchart illustrating an exemplary link setup procedure according to an embodiment of the present invention.

FIG. 5 is a flowchart illustrating an exemplary link setup procedure according to an embodiment of the present invention.

The mode II device or fixed device (represented as mode II device/fixed device hereinafter) can access the GDB through the Internet or the like to acquire a list (e.g. WSM) of available channels that can be used in the current location thereof in step S510.

The mode II device/fixed device can transmit a beacon frame to configure a BSS in step S520. The beacon frame may include information on the available channel list, etc. The beacon frame may be periodically transmitted.

A mode I device that wants to participate in the BSS can scan the TVWS in step S530. If the mode I device knows the available channel list that can be used at the current location thereof, the mode I device can perform passive or active scanning only on channels belonging to the available channel list. Passive scanning refers to a process through which the mode I device listens for transmission of the beacon frame from the mode II device/fixed device on a scanning channel. Active scanning refers to a process through which the mode I device transmits a probe request frame and receives a probe response frame from the mode II device/fixed device on the scanning channel.

To participate in the BSS, the mode I device needs to operate under the control of the mode II device/fixed device. Accordingly, the mode I device needs to perform link setup with the mode II device/fixed device.

The mode I device can perform association after the scanning process in order to participate in the BSS in step S540. To achieve this, the mode I device can transmit an association request frame to the mode II device/fixed device.

Upon successful association request/response, security setup is performed in step S550. For example, security setup can include a private key setup process through 4-way handshaking using an extensible authentication protocol over LAN (EAPOL) frame. Security setup must be performed between the mode II device/fixed device and the mode I device because integrity check is required when the mode II device/fixed device transmits a WSM to the mode I device.

Upon completion of security setup, The mode I device can request the mode II device/fixed device to provide an available channel list (e.g. WSM) by transmitting a channel availability request frame (or channel availability query (CAQ) request frame) to the mode II device/fixed device in step S560. The mode II device/fixed device can provide the available channel list (e.g. WSM) to the mode I device by transmitting a channel availability response frame (or CAQ response frame) to the mode I device. The mode I device can complete link setup with the mode II device/fixed device by receiving the available channel list (e.g. WSM) from the mode II device/fixed device. Upon completion of link setup, the mode I device can initiate transmission/reception of data, control and management frames, etc. to/from the mode II device/fixed device.

After the link setup, the mode I device may periodically receive a contact verification signal (CVS) from the mode II device/fixed device in step S570. That is, the mode I device (i.e., dependent STA) needs to be controlled by the mode II device/fixed device (i.e., enabling STA) so as to be operated in a whitespace, and the mode I device without geo-location database (GDB) access capability may use a CVS that is periodically transmitted by the mode II device/fixed device so as to check the validity of available channel/frequency. The CVS may perform a function of maintaining a valid link setup state. The CVS may include a map ID of a WSM of the mode II device/fixed device. Accordingly, the mode I device may periodically check a current valid channel and determine that a WSM that is not indicated by a map ID of CVS is not valid. That is, when the mode I device receives a CVS frame, if the CVS frame is different from a map ID of a WSM contained in the mode I device as a result of comparison therebetween, the mode I device may transmit a CAQ request frame to the mode II device/fixed device to request a new available channel list (e.g., a WSM).

Whitespace Map (WSM)

FIG. 6(a) is a diagram illustrating an example of a WSM frame format.

In FIG. 6(a), an element ID field may have a predetermined value indicating a WSM information element.

In FIG. 6(a), a length field may have values corresponding to subsequent fields. An available channel in a whitespace band varies, and thus, the length of a channel map field may vary according to the number of available channels. Thus, the value of the length field may have different values according to the size of the channel map field.

In FIG. 6(a), a map ID field may include information indicating whether a channel map is updated, and whether a channel set transmitted through a channel map corresponds to an entire or partial portion of the available channel list.

FIG. 6(b) is a diagram illustrating an example of a map ID field format.

In FIG. 6(b), a type field has a bit size of 1. When the type field has a first value (e.g., 1), the type field indicates that a corresponding channel map is a full channel list, and when the type field has a second value (e.g., 0), the type field indicates that the corresponding channel map is a partial channel list. The full channel list corresponds to a case in which available channel list information that is most lately acquired from a database (DB) is added to a channel map field and is transmitted at a point of time when a WSM is transmitted. The partial channel list corresponds to a case in which an available channel list is partially divided and a portion of the available channel list is transmitted, for reducing overhead of a frame (e.g., a beacon frame, a probe response frame, or other frames for WSM announcement) in which a WSM is transmitted.

In FIG. 6(b), a map version field is defined with a bit size of 7. Whenever an available channel is newly acquired from a GDB, a map version bit value may be increased by 1. For example, whenever an available channel list is changed/corrected, an enabling STA may increase the map version field of a map ID field of the WSM by 1 to configure a new WSM and transmit the new WSM to a dependent STA. That is, the map ID functions as an ID of the WSM. Exactly, it may be expressed that the map version bit value of the map ID field functions as an ID of the WSM.

In FIG. 6(a), a channel map field may include an available channel list (or a channel number), maximum allowed transmission power level (or a transmission power limit value), etc.

The channel number of the channel map field may be configured based on a TV channel number. However, embodiments of the present invention are not limited thereto. For example, a channel number in a unit provided by a regulatory domain DB (for example, according to regulation of each country) may be used. That is, when a smallest basic unit of an available channel list provided by a database of a TVWS band corresponds to a TV channel bandwidth, a basic unit of the channel map may be a TV channel bandwidth. For example, a TV channel bandwidth is defined as 6 MHz in Korea and in the USA and is defined as 8 MHz in Europe. According to a country, a TV channel bandwidth may be defined as 7 MHz.

FIG. 7 is a diagram illustrating an example of a channel map field format.

In examples of FIGS. 7(a) and 7(b), a device type field may indicate whether a device transmitting a WSM is an AP, an STA that is not an AP, a fixed device, or the like.

In the examples of FIGS. 7(a) and 7(b), a channel number field indicates a channel number (e.g., a TV channel number) corresponding to an available channel, and a field of a maximum transmission power level on channel X indicates a maximum transmission power constraint value allowable on channel X.

In the examples of FIGS. 7(a) and 7(b), a validity time field indicates a period of time for which an available can be continuously used.

FIG. 7(a) illustrates an example of a channel map field format in which a tuple including two fields of a channel number and a maximum transmission power level is repeated and a validity time is lastly contained. In FIG. 7(a), validity time applied to all channels contained in a channel list may be commonly configured.

FIG. 7(b) illustrates an example of a channel map field format in which a tuple including three fields of a channel number, maximum transmission power, and validity time is repeated. In FIG. 7(b), validity time applied to each channel may be individually configured.

FIG. 8 is a diagram illustrating another example of a channel map field format.

In FIG. 8, a starting channel number may include a channel number corresponding to a start location in an available channel. A field of a number of channels indicates the number of channels from the start location. A channel bitmap field may include a bit map with a length determined according to the start location and the number and have the form indicating that a channel indicated by a specific value (e.g., 1) in the bitmap is an available channel. Next, a validity time field may indicate validity time that is commonly applied to available channels, as described with reference to FIG. 7(a). The example of the channel map using the bitmap in FIG. 8 may be used when overhead can be reduced compared with the channel map field format configured by repeating a tuple in FIG. 7.

FIG. 9 is a diagram illustrating another example of a channel map field format.

FIG. 9 illustrates a method for indicating available channel information in a DB in frequency units instead of TV channel units. That is, the method corresponds to a method in which the available channel information directly indicates an empty frequency (i.e., a frequency available by an unlicensed device) that is not actually used by a licensed device.

In examples of FIGS. 9(*a*) and 9(*b*), a start frequency field indicates a start location of an available frequency range and a stop frequency field indicates a stop location of the available frequency range. A maximum allowed transmission power field indicates a maximum transmission power constraint value in a corresponding frequency range.

According to the frequency use characteristics of licensed users, the possibility that an available frequency band of unlicensed devices is non-contiguously present instead of contiguously is high. Thus, it is difficult to indicate available channel information by one frequency range, and thus, a tuple including a start frequency field, an end frequency field, and a maximum allowed power field may be repeated so as to indicate a plurality of frequency ranges.

In the example of FIG. 9(*a*), when various available frequency ranges are present, a tuple including four fields of a start frequency, a stop frequency, maximum allowed transmission power, and validity time is repeated. In this case, validity time for each frequency range may be individually configured.

In the example of FIG. 9(*b*), when various available frequency ranges are present, a tuple including three fields of a start frequency, a stop frequency, and maximum allowed transmission power is repeated. In this case, validity time applied to all frequency ranges may be commonly configured.

FIG. 10 is a diagram of another example of a channel map field format.

FIG. 10 illustrates a method for indicating available channel information in frequency units instead of TV channel units like in the example of FIG. 9.

In examples of FIGS. 10(*a*) and 10(*b*), a center frequency field indicates a location of a center frequency of an available frequency range. The channel bandwidth field indicates the size of a bandwidth based on the center frequency. One frequency range may be specified according to a center frequency and a channel bandwidth. For example, when a frequency lower than 690 MHz by a band of 10 MHz and a frequency higher than 690 MHz by a band of 10 MHz become available, signaling therefor may be configured according to center frequency=690 MHz and channel bandwidth=20 MHz. A maximum allowed transmission power field indicates a maximum transmission power constraint value allowable in a corresponding frequency range.

In the example of FIG. 10(*a*), when various available frequency ranges are present, a tuple including four fields of a center frequency, a channel bandwidth, maximum allowed transmission power, and validity time is repeated. In this case, validity time for each frequency range may be individually configured.

In the example of FIG. 10(*b*), when various available frequency ranges are present, a tuple including three fields of a center frequency, a channel bandwidth, and maximum allowed transmission power is repeated. In this case, validity time applied to all frequency ranges may be commonly configured.

Contact Verification Signal (CVS)

FIG. 11 is a diagram illustrating an example of a CVS frame format.

In FIG. 11, an element ID field may have a predetermined value indicating a CVS information element. A length field may have values corresponding to subsequent fields. In the case of CVS frame, the length of a subsequent map ID is always 1, and thus, the length field may be configured as 1.

As illustrated in the exemplary CVS frame format of FIG. 11, a CVS transmitted from an enabling STA may include a map ID of a WSM contained in the enabling STA. A detailed description of a map ID field is the same as in FIG. 6(*b*) and thus will not be repeated.

A dependent STA that periodically receives a CVS may periodically check a current valid channel and determine that a WSM that is not indicated by a map ID of CVS is not valid. That is, when the dependent STA receives a CVS frame, if the CVS frame is different from a map ID of a WSM contained in the dependent STA as a result of comparison therebetween, the dependent STA may transmit a CAQ request frame to the enabling STA to request and receive an updated WSM. When the map ID of the WSM contained in the dependent STA is the same as the map ID contained in the CVS, the dependent STA may determine that WSM is not updated and the WSM contained in the dependent STA is valid.

Here, information used to determine whether a WSM is updated may correspond to a map version field value of the map ID field, and a type bit value of a map ID field may be disregarded with regard to a CVS related operation. That is, when the map version is changed, the dependent STA may determine whether a WSM is updated.

Channel Availability Query (CAQ)

FIG. 12(*a*) illustrates an exemplary format of a CAQ request frame, and FIG. 12(*b*) illustrates an exemplary format of a CAQ response frame.

In FIGS. 12(*a*) and 12(*b*), a category field indicates a category to which a corresponding frame belongs. In this example, the category field may be configured as a value indicating a public action frame to which CAQ request/response belongs. A public action field acts a function of indicating an operation associated to a corresponding frame. In this example, the public action field may be configured as a specific value for a CAQ request/response frame. A length field may have a value corresponding to a length of a subsequent field.

In FIG. 12(*a*), the CAQ request frame may include device class information, device identification information, etc. of an STA that requests a CAQ and may optionally include device location information.

In FIG. 12(*a*), a device class field may include information indicating whether the STA that request a CAQ is a fixed device or a P/P device (in detail, the mode II device or the mode I device), or information indicating a target device of acquisition of available channel information by the STA. When the STA that request a CAQ intends to directly or indirectly access a DB to acquire an available channel list, different available information lists according to a device type are present, and thus, information about a device class is required. For example, different available channels may be configured according to a device type by considering that a fixed device with maximum allowable transmission power of 4 W causes higher interference to an adjacent channel than a P/P device with limited maximum allowable transmission power of 100 mW.

In FIG. 12(*a*), a device identification information field may include identification information defined by a regulatory domain for an STA that requests a CAQ. For example, in the USA, a FCC ID allocated by FCC, a serial number allocated by a manufacturer, etc. may be used.

In FIG. 12(*a*), a device location field may include information about a current location of an STA that requests a CAQ, information about a location to which the STA intends to move, or the like. The location information may include information about a latitude, a longitude, and an altitude and may optionally include information about an azimuth.

Based on information contained in a CAQ request frame transmitted from the aforementioned request STA (e.g., a dependent STA), a response STA (e.g., an enabling STA) may determine channel information that can be used by the request STA and inform the request STA of the channel information through a CAQ response frame.

In FIG. 12(b), a WSM information element (WSM IE) of the CAQ response frame may include available channel information for the request STA. Detailed configuration of the WSM IE (or a channel map contained in a WSM) may be the same as in FIGS. 6 to 10.

Enhanced CAQ Related Operation

Prior to a description of an enhanced CAQ related operation proposed by the present invention, an operation of a dependent STA according to an enablement validity timer will be described. The timer may be configured to operate during time duration T with a CVS interval, and for example, T=60 seconds may be defined. The timer may be defined as follows. When the timer operates, the dependent STA is in an enabled state, and when the timer is expired, the dependent STA is in a de-enabled state or an un-enabled state.

Figure 13:
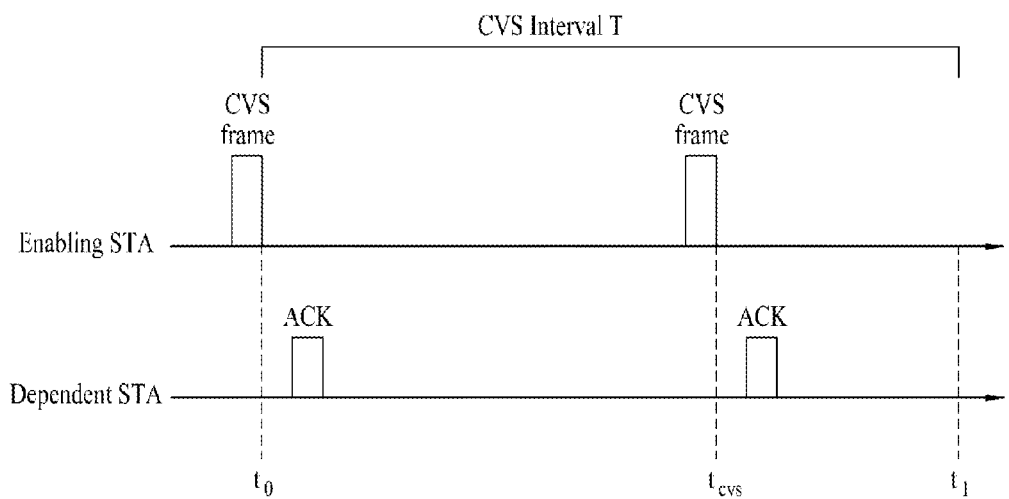
FIGS. 13 and 14 are diagrams for explanation of operations of a dependent STA and an enabling STA associated with transmission and reception of a CVS frame.

FIG. 13 is a diagram for explanation of an operation when a map ID of a CVS is not changed based on a map ID contained in a STA.

An enabling STA may periodically transmit a CVS frame to a dependent STA. FIG. 13 illustrates a case in which a CVS transmission period is $t_{CVS}$. That is, the enabling STA may transmit a CVS frame at $t_{CVS}$ after transmitting a CVS frame at $t_0$.

Upon reception of a CVS frame, the dependent STA may feedback acknowledgement (ACK) to the enabling STA. FIG. 13 illustrates a case in which a predetermined period of time is taken to receive and process the CVS frame, to check whether reception is successfully achieved, and to generate and transmit ACK information by the dependent STA.

The dependent STA that receives the CVS frame may check map ID information contained in the CVS frame and compare the checked map ID with a map ID (or a map ID received through a CVS frame just before the received CVS frame) contained in the dependent STA. As the comparison result, when the map IDs are the same, the dependent STA may assume that a currently contained WSM is valid and may continuously use a current channel.

Here, the dependent STA may operate a timer related to WSM validity time. When the corresponding timer is expired, the dependent STA cannot use a channel and is converted into an un-enabled state. That is, the dependent STA may determine that an available channel belonging to the dependent STA is valid only when the timer operates.

Upon reception of a WSM or a CVS frame from an enabling STA, the dependent STA may update (or restart) the timer. Upon reception of the WSM, the dependent STA may add a validity time value contained in the WSM to update the timer. Upon reception of the CVS frame, when a map ID contained in the CVS frame is the same as a map ID contained in the dependent STA, the dependent STA may add a CVS interval to update the timer.

In the example of FIG. 13, a dependent STA that receives a first CVS frame at a point of time $t_0$ may operate a timer during a CVS interval (i.e., T). Before the timer with a length T is expired, the dependent STA that receives a second CVS frame at a point of time $t_{CVS}$ may operate the timer during T from $t_{CVS}$. That is, the dependent STA may operate after checking that the timer is expired at a point of time $t_{CVS}$+T. When the dependent STA cannot receive the second CVS frame, the dependent STA checks that the timer is expired at a point of time t1 (i.e., $t_0$+T), and then cannot use a channel and is converted into an un-enabled state.

Figure 14:
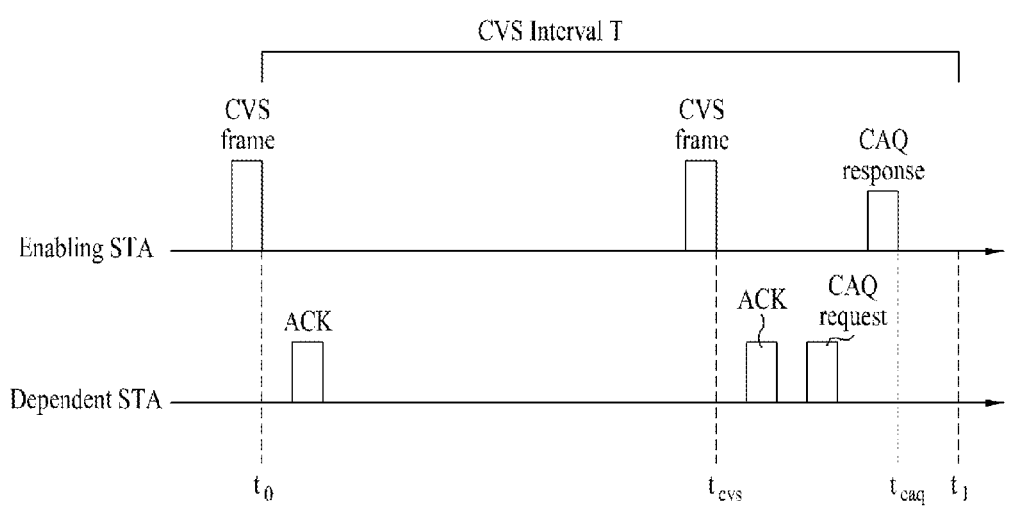

FIG. 14 is a diagram for explanation of an operation when a map ID of a CVS is changed based on a map ID contained in a dependent STA.

In an example of FIG. 14, it is assumed that, when the dependent STA receives a second CVS frame at a point of time $t_{CVS}$, a value of a map ID contained in a second CVS frame is different from a value of a map ID (e.g., a map ID received through a first CVS frame) contained in the dependent STA. In this case, the dependent STA can know that a channel that is currently used by the dependent STA is not valid any longer and needs to perform an operation for acquisition of new available channel information. That is, the dependent STA may feedback ACK for a second CVS frame and may simultaneously request a new WSM to an enabling STA through a CAQ request framer. The enabling STA that receives the CAQ request frame may provide a new WSM to the dependent STA through the CAQ response frame. In the example of FIG. 14, the dependent STA that receives the new WSM at a point of time $t_{CAQ}$ may update the timer based on validity time information contained in the WSM. For example, the dependent STA may operate after checking that the timer is expired at a point of time $t_{CAQ}$+ $T_{WSM}$.

Here, when the map ID received by the dependent STA through the CVS frame is different from a map ID contained in the dependent STA, the dependent STA may maintain an enabled state and may continuously operate in a whitespace based on the new WSM only when a process for acquiring of the new via exchange of CAQ request/response frame is completed before existing timer expiration time (i.e., $t_1$ in FIG. 14). In other words, in the example of FIG. 14, when the dependent STA cannot acquire the new WSM before t1, the dependent STA needs to be converted into an un-enabled state after t1.

For example, in FIG. 14, when the dependent STA transmits the CAQ request frame to an enabling STA before $t_1$ but receives a CAQ response frame after $t_1$, the dependent STA cannot assume that a WSM contained in the dependent STA is valid during time duration to a CAQ response frame reception point of time after $t_1$. In addition, in FIG. 14, when a time duration to $t_1$ from $t_{CVS}$ when the dependent STA receives a CVS frame is insufficient to generate and transmit the CAQ request frame, the dependent STA cannot assumed that a WSM contained in the dependent STA is valid during time duration between a CAQ request frame transmission point of time and a CAQ response frame reception point of time after $t_1$. Accordingly, in the above example, the dependent STA needs to be converted into an un-enabled state after $t_1$. However, since the dependent STA performs a CAQ request/response operation, problems arise in that an operation of the dependent STA is indistinct.

Accordingly, the present invention proposes that a CAQ operation is performed according to whether remaining time is sufficient to the CAQ request/response operation or not until the WSM validity time is expired when the dependent STA receives a CVS frame.

Figure 15:
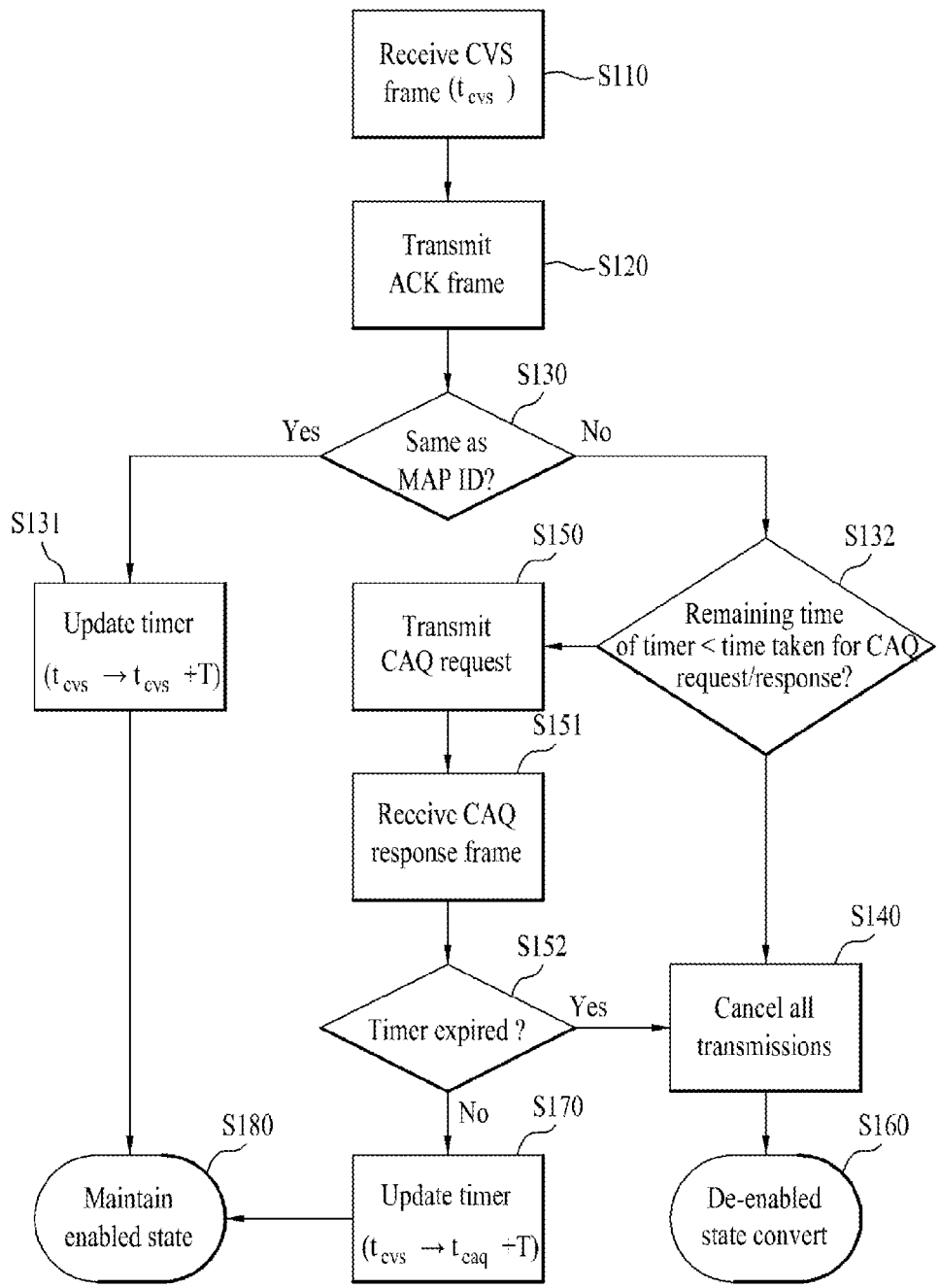
FIG. 15 is a flowchart for explanation of an example of an operation of a dependent STA based on reception of a CVS frame according to the present invention.

FIG. 15 is a flowchart for explanation of an operation related to an enablement validity timer of a dependent STA according to an embodiment of the present invention.

In operation S110, the dependent STA may receive a CVS frame. Like in the examples of FIGS. 13 and 14, a CVS reception point of time is referred to as $t_{CVS}$. In operation S120, the dependent STA may generate and transmit an ACK frame of the CVS frame. In operation S130, the dependent STA may determine whether a map ID contained in the received CVS frame is the same as a map ID contained in the dependent STA. The map IDs may be compared by comparing map version values.

As the determination result in operation S130, when the map version values are the same, operation S131 may be performed to update the enablement validity timer. That is, the timer may be updated to be expired at a point of time $t_{CVS}$+T. Thus, like in operation S180, the dependent STA may be maintained in an enabled state.

As the determination result of operation S130, when the map version values are different, operation S132 is performed. In operation S132, the dependent STA may determine whether the remaining time duration (i.e., time duration of T−$t_{CVS}$) of the timer is shorter than time duration taken for CAQ request/response.

When the remaining time duration is shorter than the time duration taken for CAQ request/response, operation S140 is performed to cancel CAQ request frame transmission. Thus, the dependent STA may be converted into an un-enabled state in operation S180.

When the remaining time duration is longer than the time duration taken for CAQ request/response, operation S150 is performed. In operation S150, the dependent STA may transmit a CAQ request frame, and in operation S151, the dependent STA may receive a CAQ response frame.

In operation S152, whether the timer is expired may be determined once more in order to prevent errors of an STA operation when expectation of the dependent STA regarding the remaining time duration and the time duration taken for CAQ request/response is not accurate in operation S132. When it is assumed that the expectation of the dependent STA in operation S132 is accurate, operation S152 may be omitted.

In operation S152, when the timer is not expired, operation S170 may be performed to update the timer. That is, when a CAQ response frame reception point of time is $t_{CAQ}$, the timer may be updated to be expired at a point of time $t_{CAQ}$+T. Thus, in operation S180, the dependent STA may be maintained in an enabled state.

As the determination result of operation S152, although the dependent STA receives a CAQ response frame, when the timer is expired, operation S140 may be performed to convert a state of the dependent STA into an un-enabled state.

As described above, the operation related to the enablement validity timer of the dependent STA may be defined according to the present invention as follows. When the dependent STA receives a CVS frame and a map ID (in detail, a map version) contained in the CVS frame is changed, the dependent STA may not always perform a CAQ request/response operation but may perform the CAQ request/response operation only when the remaining time of the timer is sufficient to CAQ request/response. Thus, indistinctness of operations of the dependent STA may be removed, unnecessary use of radio resources may be prevented, and in particular, the dependent STA in a TVWS may be prevented from causing interference.

Enhanced WSM Update Operation

An STA needs to know available channel information so as to appropriately operate in a TVWS. For example, an available channel in the TVWS may be changed according to time and a location of the STA. When an STA that does not know available channel information also scans an AP in a channel that is not available in the TVWS, too much time may be consumed to scan the AP. In addition, when there is no available channel in the TVWS, the STA may also perform scanning.

In addition, the possibility that a device that operates in the TVWS has a communication module that operates only in the TVWS is not high. For example, according to users' requirements, the possibility that a device having a communication module that support a TVWS band and other bands (e.g., one or more of 2.4 GHz, 5 GHz, 900 MHz, 60 GHz, and a cellular band), that is, a multi-band mode device is manufactured and used is high. In terms of the TVWS operation, the TVWS band may be referred to as in-band and other bands may be referred to as out-band.

The multi-band mode device may operate in out-band (e.g., 2.4 GHz) in which channels can be stably achieved, and then, operate in in-band when an available channel is present in the TVWS. In this case, when the available channel is present in the TVWS, an AP that operates in out-band may provide available channel information in the TVWS to an STA. The STA may be converted into a TVWS (i.e., in-band) operation mode and may perform a scanning operation, etc. in the TVWS using the TVWS available channel information acquired in out-band.

The TVWS available channel information (i.e., WSM) in in-band may be used to maintain or update the WSM in the STA that receives the WSM. The TVWS available channel information in out-band needs to be used to provide simple information about the WSM in the TVWS, that is, for informative purpose rather than being used to maintain or update the WSM. Accordingly, it is necessary to differentiate a general-purpose WSM and an informative-purpose WSM.

The present invention proposes a method of differentiating the general-purpose WSM and the informative-purpose WSM. The present invention proposes a method of classifying a WSM into the general-purpose WSM and the informative-purpose WSM using a map ID contained in a WSM information element or a map ID contained in a CVS frame. Here, the general purpose corresponds to a WSM that is associated to an operation of maintaining the WSM or performing CAQ request/response transmission and reception according to CVS reception, is associated to whether the enablement validity timer is updated, or affects an enablement state (i.e., an enabled state, an un-enabled state, etc.) of a dependent STA in a TVWS. The informative purpose corresponds to a WSM that is used to provide simple information without affecting an enablement state of the dependent STA.

According to the present invention, a WSM may be broadcast or unicast in in-band and/or out-band for informative purpose.

In a detailed example of the present invention, one specific value in a map ID may be defined to indicate informative purpose. In particular, since a dependent STA determine whether a WSM is updated according to a map version value of a map ID, when the specific value of the map version is defined to indicate informative purpose, the dependent STA can differentiate general purpose and informative purpose. Since a map version field has a bit length of 7, the map version field can express 128 of total states. Among the bit states, a last bit state (or a last value of the corresponding field) may be defined as informative purpose. When the map version field has a value of 0 to 127, map version=127 may indicate informative purpose. When the map version field has a value of 1 to 128, map ID version=128 may indicate informative purpose. In addition, map version=127 or 128 may indicate informative purpose.

Thus, when a map version value is 127 or 128, the map version value simply indicates that a corresponding WSM is used to simply indicate related information, and thus, even if a dependent STA receives the corresponding WSM, the dependent STA cannot obtain a right to use a channel in the WSM. That is, a map version value configured as 127 (or 128) may not cause change in an enablement state of the dependent STA and WSM update. On the other hand, when a map version value is not 127 or 128, a dependent STA that receives the map version value can obtain a right to use a channel determined according to a corresponding WSM.

Both map version values of 127 and 128 may be used to indicate an informative WSM. In this regard, map version values may be further defined such that a map version value of 127 corresponds to a partial channel list and a map version value of 128 corresponds to an entire channel list. Alternatively, the map version values may be defined in such a way that indication of the entire or partial channel list is determined by a type field of a map ID like in a conventional art, and a map version value of 127 (or 128) indicates informative purpose.

The dependent STA may receive map ID (in particular, map version) information through a CVS frame. Here, the CVS frame does not include a WSM information element but includes only map ID information, and thus, the CVS frame is not used to provide WSM information. Thus, when a map version value is 127 (or 128), the dependent STA may not perform any operation or may process this situation as errors. In this case, a type file value of a map ID field may be disregarded.

In a conventional method of determining a map version value, whenever an enabling STA transmits an updated WSM, a map version bit value of a map ID field of a WSM information element is increased by 1 and is determined according to a modulo 128 operation. Here, the modulo 128 operation may refer to calculation for obtaining a remainder from division by 128 and have a calculation result of 0 to 127.

According to the present invention, a specific value (e.g., 127) of a map version is defined to indicate informative purpose, and thus, a map version value indicating general purpose needs to be determined among values except for the specific value. Accordingly, the map version value of general purpose is determined according to the modulo 128 operation. In this case, when a WSM that is updated while a map version value is 126 is transmitted, a map version value of the corresponding updated WSM may be configured as 0. In the aforementioned other example, when a map version value is 1 to 128 and a map version field of 127 or 128 is used for informative purpose, a map version value of general purpose may be determined according to a modulo 126 operation (here, a general modulo 126 operation has a result of 0 to 125, but a map version value is in the range of 1 to 128 in the present example, and thus, map version values may be defined as 1 to 126 by adding 1 to the result of the general modulo 126 operation). In this case, when a WSM that is updated while a map version value is 126 is transmitted, a map version value of the corresponding updated WSM may be configured as 1.

Figure 16:
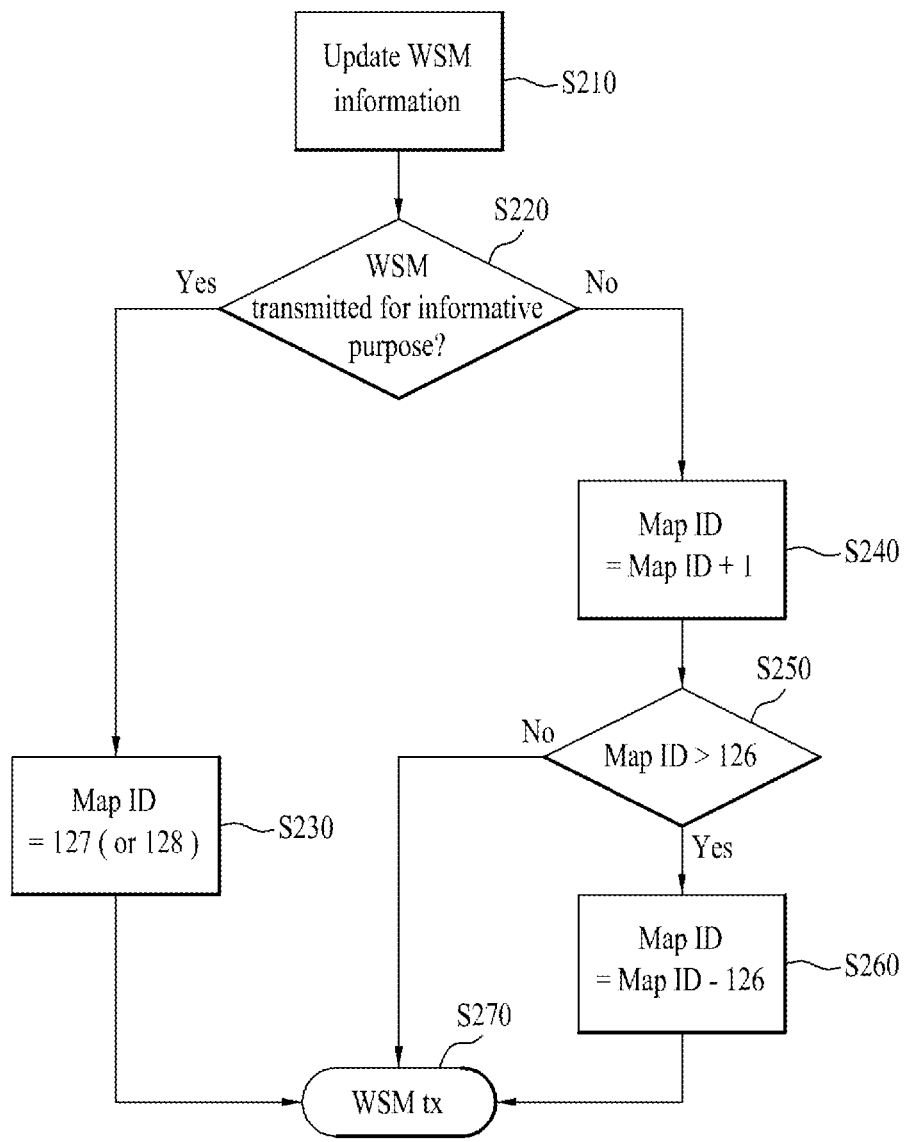
FIG. 16 is a diagram for explanation of an example of configuration of WSM map ID information of an enabling STA according to the present invention.

FIG. 16 is a flowchart for explanation of an example of configuration of map ID information of an enabling STA according to the present invention.

In operation S210, the enabling STA may update WSM information. The updated WSM may be generated based on available channel information from a GDB or the like.

In operation S220, the enabling STA may determine whether a WSM is transmitted for general purpose or informative purpose. When an informative-purpose is transmitted, in operation S230, a map ID (in detail, a map version) value is configured as 127 (or 128), and in operation S270, a WSM with a map version value of 127 (or 128) may be transmitted to a dependent STA. Thus, the dependent STA can recognize that the corresponding WSM is for informative purpose.

In operation S220, when the enabling STA determines that the WSM is transmitted for general purpose, a map ID (in detail, a map version) value may be increased by 1, in operation S240. In operation S250, whether the map ID value increased in operation S240 exceeds 126 may be determined. When the map ID value does not exceed 126, operation S270 may be performed, and when the map ID value exceeds 126, 126 is subtracted from the map ID value increased in operation 260 to configure a map ID value, which corresponds to the aforementioned modulo 126 operation. When a map version value of informative purpose is configured as only one value (e.g., 127), a modulo 127 operation may be performed by subtracting 1 from a result of a case in which a map version value exceeds 127.

According to a result of operation S250 or S260, a WSM having a map version value updated in operation S270 may be transmitted to the dependent STA. Thus, the dependent STA can recognize that the received WSM is for general purpose and has been updated based on the fact in that a map version value is not 127 (or 128) and is different from a map version value contained in the dependent STA.

Figure 17:
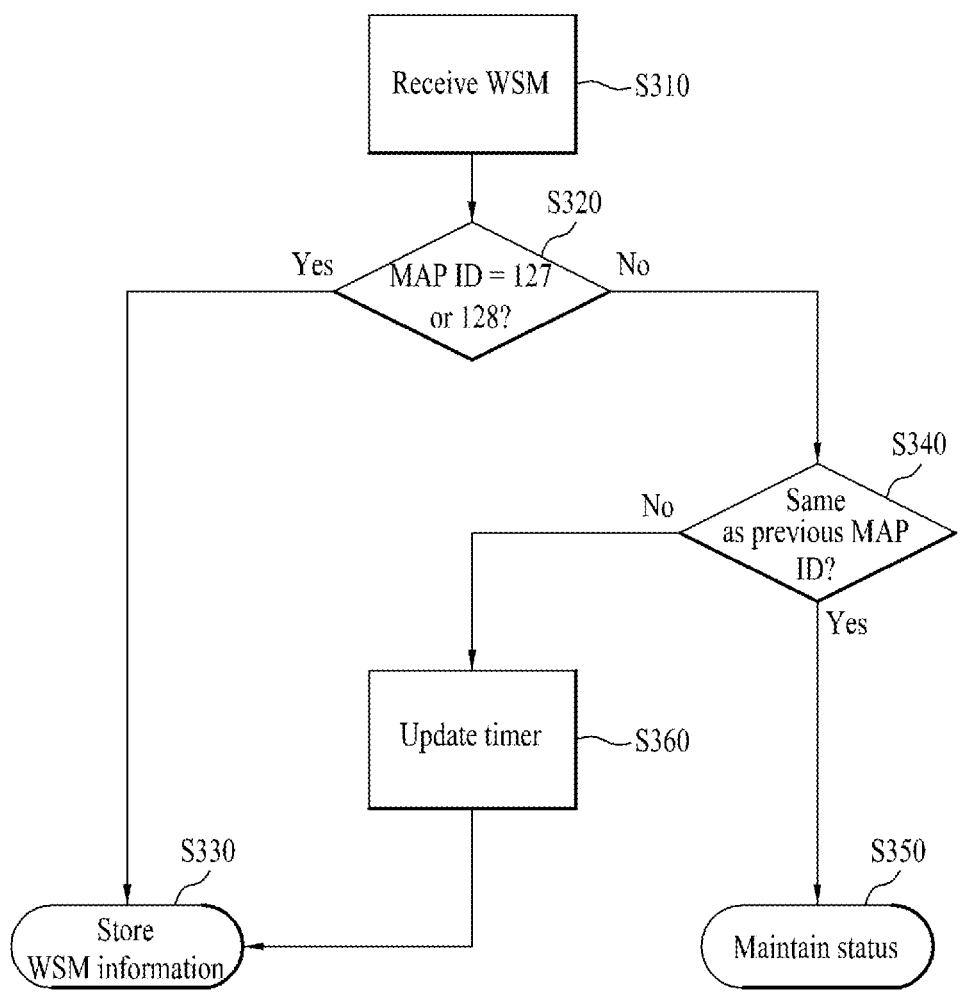
FIG. 17 is a diagram for explanation of an example of WSM reception of a dependent STA according to the present invention.

FIG. 17 is a diagram for explanation of an example of reception of a WSM of a dependent STA according to the present invention.

In operation S310, the dependent STA may receive WSM information from an enabling STA. The WSM information includes a map ID field and a WSM.

In operation S320, the dependent STA may determine whether a value of the received map ID field (in particular, a map version field) indicates informative purpose. For example, when a map version value is 127, the map version value may indicate informative purpose. Otherwise, the map version value may indicate general purpose.

When the map version value indicates informative purpose, the dependent STA can recognize that the corresponding WSM does not affect an enablement state. Thus, in operation S330, the dependent STA may store WSM information for informative purpose only. The stored WSM information may be used to determine a target channel to be scanned by the dependent STA as necessary.

When it is determined that the map ID field (in particular a map version field) received in operation S320 is not for informative purpose, the dependent STA proceeds to operation S340. In operation S340, the dependent STA may determine whether the received map ID value is the same as a map ID contained in the dependent STA. When the map ID values (in particular, map version values) are the same, operation S350 may be performed to maintain an enablement state and to continuously use an available channel determined by a previous WSM. When the map ID values (in particular, map version values) are different, operation S360 may be performed to newly update the timer, and the received WSM information (i.e., updated WSM information) may be stored in operation S370.

Figure 18:
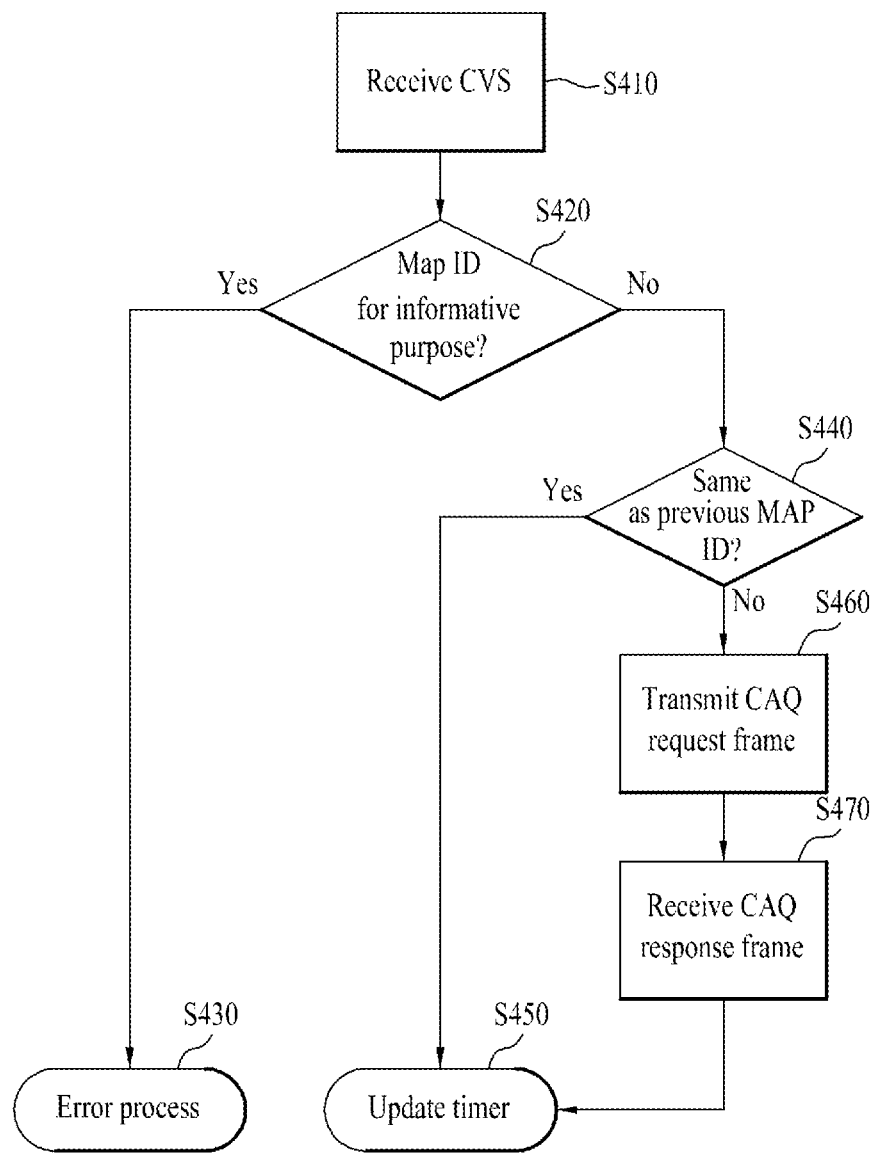
FIG. 18 is a diagram for explanation of an example of CVS reception of a dependent STA according to the present invention.

FIG. 18 is a diagram for explanation of an example of CVS reception of a dependent STA according to the present invention.

In operation S410, the dependent STA may include a CVS frame from an enabling STA. The CVS frame includes a map ID field.

In operation S420, the dependent STA may determine whether a value of the received map ID field (in particular, a map version field) indicates informative purpose. For example, when a map version value is 127, the map version value may indicate informative purpose. Otherwise, the map version value may indicate general purpose.

Here, the CVS frame indicates a map ID of a current valid WSM and does not include WSM information. Thus, it is appropriate that the CVS frame does not include an informative-purpose map ID. Thus, when the dependent STA determines that the value of the map ID (in particular a map version) in the CVS frame indicates informative purpose, the dependent STA may not perform any operation. For example, in operation S430, the dependent STA may process a CVS frame including an informative-purpose map ID as errors.

When the dependent STA determines that a value of the map ID field (in particular, a map version field) received in operation S420 is not for informative purpose (i.e., is for general purpose), the dependent STA proceeds to operation S440. In operation S440, the dependent STA may determine whether the value of the received map ID is the same as a map ID value contained in the dependent STA. When the map ID values (in particular, map version values) are the same, this means that WSM information contained in the dependent STA is valid during a CVS interval, and thus, operation S450 may be performed to update the timer and maintain current channel use.

In operation S440, when the map ID values (in particular, map version values) are different, operation S460 may be performed to transmit a CAQ request frame to an enabling STA, and a CAQ response frame may be received from the enabling STA to acquire an update WSM, in operation. Here, operations S460 and S470 may be performed only when the remaining time of the timer is sufficient for a CAQ request/response operation like in the example of FIG. 15.

As described with reference to the aforementioned embodiments of the present invention, according to the present invention, a specific map ID value (e.g., map version=127) may be defined to indicate that a WSM indicates informative purpose. A dependent STA that receives a WSM indicating informative purpose may perform an operation such as scanning in a TVWS band using available channel information in a TVWS indicated by the corresponding WSM but may not update a WSM contained in the dependent STA. A dependent STA that receives a CVS including map version information indicating informative purpose may not perform a CAQ request/response operation for updating a WSM containing the dependent STA and may not interpret the map version information as indicating a current valid available channel (i.e., for purpose of CVS) (i.e., the dependent STA may not update the timer and wait for a new CVS including a valid map ID (i.e., a general purpose map ID)).

When a dependent STA that operates in in-band or a dependent STA that operates in out-band receives an informative-purpose WSM, the dependent STA may store the corresponding WSM and use the WSM for subsequent scanning, which the same as in the above description. When the dependent STA that operates in in-band receives a general-purpose WSM (e.g., a WSM having a map version value except for 127), the dependent STA may perform an operation such as WSM maintenance/update, etc. However, the dependent STA that operates in out-band can operate by receiving only an informative-purpose WSM. That is, this is because the dependent STA that operates in out-band does not require WSM update in TVWS (i.e., in-band) and it is sufficient to store the informative-purpose WSM as basic information for performing scanning for subsequent operations in a TVWS.

A dependent STA that receives and stores informative-purpose WSM information may perform scanning in a TVWS using the corresponding WSM information. As described with reference to FIG. 5, when the dependent STA scans enabling STAs in the TVWS band and receives a beacon of a specific enabling STA, the dependent STA may transmit an association/authentication request frame to the corresponding enabling STA. Here, the dependent STA may configure transmission power of the association/authentication request frame using maximum transmission power information contained in the stored informative-purpose WSM information. In general, maximum transmission power available in an unlicensed band (or an industrial scientific and medical (ISM) wireless band) may be determined every frequency band according to regulation and may be a static value, and it may be assumed that all devices that operate in a corresponding band know power constraint defined according to the regulation. However, whether a licensed user is present in an adjacent channel of an available channel in a TVWS band may be changed according to time/location, maximum transmission power may be differently configured according to time/location despite the same frequency band (or the same channel). Accordingly, when maximum transmission power of an available channel is not obviously signaled in a TVWS, an STA that initially enters the TVWS cannot know transmission power with which the association/authentication request frame is to be transmitted. Accordingly, an STA that stores the informative-purpose WSM information may determine initial transmission power using maximum transmission power information contained in the informative-purpose WSM. Furthermore, upon determination of transmission power in an available channel in a TVWS band, the STA may additionally consider local power constraint contained in the beacon frame. For example, the local power constraint of the beacon frame may be subtracted from the transmission power. Alternatively, the transmission power may be configured not to exceed lower transmission power constraint of maximum allowed transmission power of WSM information and the local power constraint of the beacon frame.

Figure 19:
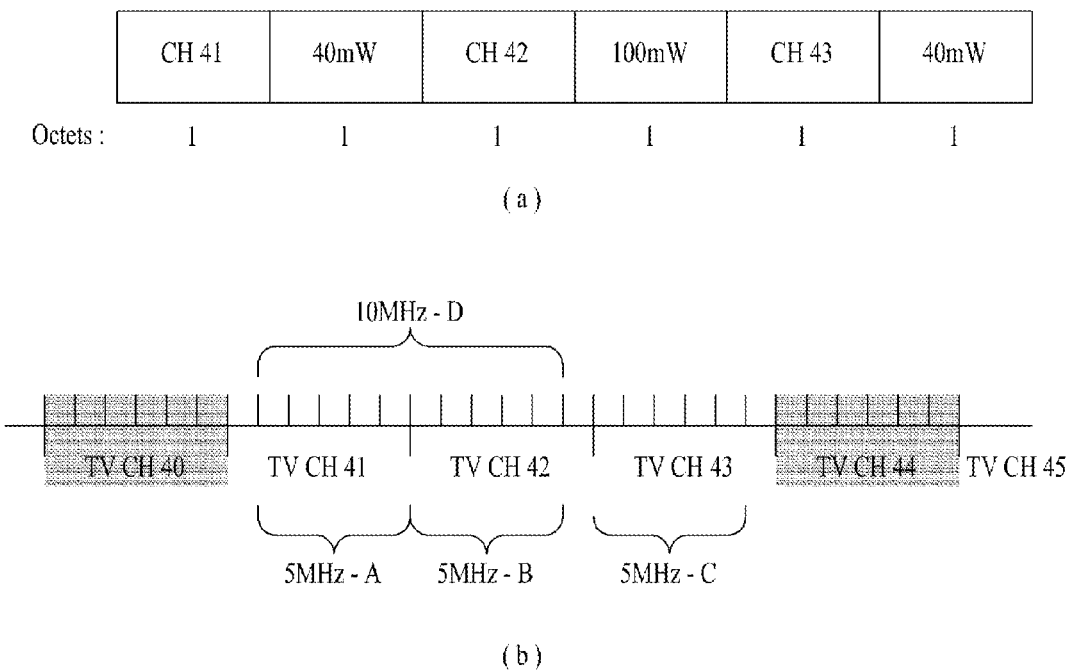
FIG. 19 is a diagram illustrating an example of WSM information and TVWS available channel.

FIG. 19(a) illustrates an example of WSM information. FIG. 19(b) is a diagram illustrating an example of maximum transmission power in a TVWS available channel according to the WSM information.

For example, when an STA receives informative-purpose WSM information, a channel map of the WSM information may be configured as illustrated in FIG. 19(a). For example, maximum transmission power of 40 mW may be allowed in TV channel #41, maximum transmission power of 100 mW may be allowed in TV channel #42, and maximum transmission power of 40 mW may be allowed in TV channel #43.

In FIG. 19(b), TV channels #40 to 45 are exemplified and it is assumed that each TV channel has a bandwidth of 6 MHz. When a dependent STA transmits an initial request frame in a band indicated by 5 MHz-A or 5 MHz-C in FIG. 19(b), maximum transmission power is limited to 40 mW as defined in channel map information of FIG. 19(a). When the dependent STA transmits the initial request frame in a band indicated by 5 MHz-B in FIG. 19(b), transmission power is also allowed to 100 mW as defined in the channel map information of FIG. 19(a).

In addition, it will be assumed that a band of 10 MHz-D (i.e., a bandwidth across TV channels #41 and #42) of FIG. 19(b) is used through a beacon frame of the enabling STA, received by the dependent STA, is used. In this case, maximum transmission power of channel #42 is 100 mW but maximum transmission power of channel #41 is 40 mW, and thus, when the dependent STA transmits an initial request frame such as association/authentication request in a band such as 100 MHz-D, maximum transmission power cannot be configured to exceed 40 mW due to lower power constraint (i.e., 40 mW as transmission power constraint in channel #41). Thus, upon determination of transmission power in a TVWS band, the dependent STA may perform transmission in a TVWS band using WSM information (e.g., the informative-purpose WSM information) contained in the dependent STA according to transmission power constraint of a channel having lowest maximum allowed transmission power among available channel(s) contained in a bandwidth occupied by the dependent STA.

The various aforementioned embodiments of the present invention propose a method of using WSM information without any relation with an enabling process (or without affecting an enablement state) by a dependent STA. In this regard, the used WSM information may be referred to as informative WSM information. In order to identify the informative WSM information, like the proposal of the present invention, a specific map version value (e.g., 127) may be used.

Since a TVWS has a wide bandwidth and numerous channels, when the dependent STA intends to perform scanning to search for TVWS available channel information without appropriate information, time taken for a corresponding operation may be significantly increased. However, according to the present invention, for example, when informative-purpose WSM information is used, an STA that operates in a band (i.e., out-band) except for a TVWS band can acquire WSM information in the TVWS band, and thus, time taken to search for a TVWS available channel can be significantly reduced during operation in the TVWS band. According to conventional art prior to proposal of the present invention, informative-purpose WSM information is not defined, and thus, the above effect cannot be achieved. However, according to the present invention, informative-purpose WSM information may be defined and an indicator for differentiating the informative-purpose WSM information from WSM information of other purposes may be defined, thereby supporting a more effective operation of the dependent STA in a TVWS.

In addition, maximum transmission power of a dependent STA or an enabling STA varies according to a TV band device (TVBD) is present in an adjacent channel in a TVWS band. The dependent STA can know whether an adjacent channel is used by the TVBD as well as information about available channels through the informative-purpose WSM information proposed by the present invention. Thus, the dependent STA may adjust transmission power of the dependent STA according to a TVWS environment. According to conventional art prior to proposal of the present invention, during scanning, the dependent STA cannot know allowed transmission power in a corresponding frequency band, only a passive scanning operation is allowed. However, according to the present invention, since the dependent STA can know transmission power in the corresponding frequency band using the informative-purpose WSM, the dependent STA can perform active scanning and can reduce time taken for channel scanning compared with passive scanning.

The above-described embodiments of the present invention can be independently applied or two or more embodiments can be simultaneously applied.

Figure 20:
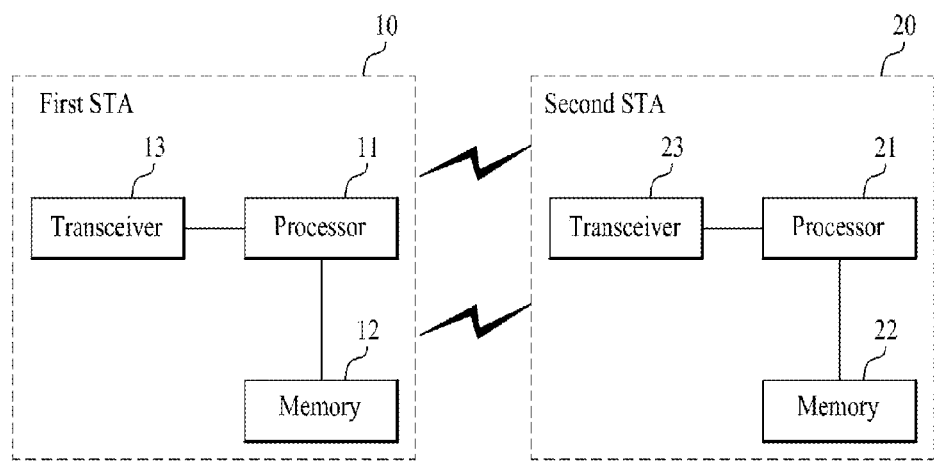
FIG. 20 is a block diagram illustrating the structure of a wireless apparatus according to an embodiment of the present invention.

FIG. 20 is a block diagram illustrating the structure of a wireless apparatus according to an embodiment of the present invention.

A first STA 10 may include a processor 11, a memory 12, and a transceiver 13. A second STA 20 may include a processor 21, a memory 22, and a transceiver 23. The transceivers 13 and 23 may transmit/receive radio signals and implement a physical layer according to IEEE 802, for example. The processor 11 and 21 can be connected to the transceiver 13 and 23 to implement the physical layer and/or an MAC layer according to IEEE 802. The processor 11 and 21 can be configured to perform operations according to the above-described embodiments of the present invention. Modules for implementing operations of the first and second STAs according to the above-described embodiments of the present invention can be stored in the memory 12 and 22 and executed by the processor 11 and 21. The memory 12 and 22 can be included in the processor 11 and 21 or provided outside the processor 11 and 21 and connected to the processor 11 and 21 through known means.

An apparatus of the first STA 10 according to an embodiment of the present invention may be configured to transmit WSM information to the second STA 20. The processor 11 of the first STA 10 may be configured to configure a map version bit value included in the WSM information to a predetermined value (e.g., 127) when the WSM information is for informative purpose. The processor 11 of the first STA 10 may be configure to transmit the WSM information including a map version bit having the predetermined value to the second STA 20 using the transceiver 13.

An apparatus of the second STA 20 according to an embodiment of the present invention may be configured to receive WSM information from the first STA 10. The processor 21 of the second STA 20 may be configured to receive the WSM information including a map version bit from the first STA 10 using the transceiver 23. The processor 21 of the second STA 20 may be configured to determine whether the map version bit value corresponds to a predetermined value (e.g., 127). When the map version bit value correspond to the predetermined value, the processor 21 of the second STA 20 may be configured to store the received WSM information in the memory 22 for informative purpose.

The configuration of the first STA 10 and the second STA 20 can be implemented such that the above-described embodiments of the present invention are independently applied or two or more embodiments are simultaneously applied and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method of transmitting whitespace map (WSM) information from a first station (STA) to a second STA, the method comprising:
configuring a value of a map version bit contained in the WSM information; and
transmitting the WSM information containing the map version bit to the second STA,
wherein, when the WSM information corresponds to a first purpose, the map version bit is set to a first value corresponding to a WSM update count obtained by a modulo operation, and
wherein, when the WSM information corresponds to a second purpose, the map version bit is set to a second value that exceeds an available range of the WSM update count that is limited by the modulo operation.

2. The method according to claim 1, wherein the map version bit configured to the first value indicates that an updated WSM is transmitted.

3. The method according to claim 2, wherein the first value of the map version bit is increased by 1 whenever the updated WSM is transmitted.

4. The method according to claim 1, wherein the second value is fixed to 127.

5. The method according to claim 1, wherein the map version bit configured to the second value does not cause change in enablement state of the second STA.

6. The method according to claim 1, wherein the map version bit configured to the second value does not cause WSM update of the second STA.

7. The method according to claim 1, wherein a target channel to be scanned by the second STA is determined based on available channel information indicated by the WSM information corresponding to the second purpose.

8. The method according to claim 1, wherein transmission power in a whitespace band of the second STA is determined based on maximum transmission power information indicated by the WSM information corresponding to the second purpose.

9. A method of receiving whitespace map (WSM) information from a first station (STA) to a second STA, the method comprising:
receiving the WSM information containing a map version bit from the first STA;
determining whether a value of the map version bit is:
a first purpose value corresponding to a WSM update count obtained by a modulo operation; or
a second purpose value that exceeds an available range of the WSM update count that is limited by the modulo operation; and
comparing the value of the map version bit with a WSM version stored in the second STA when the value of the map version bit is the first purpose value.

10. A first station (STA) for transmitting whitespace map (WSM) information to a second STA, the first STA comprising:
a transceiver configured to transmit and receive to and from other devices; and
a processor configured to:
control the first STA comprising the transceiver;
configure a value of a map version bit contained in the WSM information; and
transmit the WSM information having the predetermined value to the second STA using the transceiver,
wherein, when the WSM information corresponds to a first purpose, the map version bit is set to a first value corresponding to a WSM update count obtained by a modulo operation, and
wherein, when the WSM information corresponds to a second purpose, the map version bit is set to a second value that exceeds an available range of the WSM update count that is limited by the modulo operation.

11. A second station (STA) for receiving whitespace map (WSM) information from a first STA, the second STA comprising:
a transceiver configured to transmit and receive to and from other devices; and
a processor configured to:
control the second STA comprising the transceiver;
receive the WSM information containing a map version bit from the first STA;
determine whether a value of the map version bit is:
a first purpose value corresponding to a WSM update count obtained by a modulo operation; or
a second purpose value that exceeds an available range of the WSM update count that is limited by the modulo operation; and
compare the value of the map version bit with a WSM version stored in the second STA when the value of the map version bit is the first purpose value.

12. The method according to claim 1, wherein the available range of the WSM update count includes 0 to 126.

* * * * *